(12) United States Patent
Maeda

(10) Patent No.: US 7,492,113 B2
(45) Date of Patent: Feb. 17, 2009

(54) BRUSHLESS MOTOR DRIVE CONTROL CIRCUIT AND BRUSHLESS MOTOR DEVICE USING THE SAME

(75) Inventor: Norihiro Maeda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 147 days.

(21) Appl. No.: 11/596,770

(22) PCT Filed: May 26, 2005

(86) PCT No.: PCT/JP2005/009625

§ 371 (c)(1),
(2), (4) Date: Nov. 17, 2006

(87) PCT Pub. No.: WO2005/117249

PCT Pub. Date: Dec. 8, 2005

(65) Prior Publication Data

US 2007/0176567 A1    Aug. 2, 2007

(30) Foreign Application Priority Data

May 28, 2004    (JP)    ............................. 2004-160355

(51) Int. Cl.
*H02P 6/00*    (2006.01)
(52) U.S. Cl. .................. 318/400.01; 318/459; 318/700; 318/368; 318/145
(58) Field of Classification Search ............ 318/400.01, 318/700, 459, 368, 145
See application file for complete search history.

(56) References Cited

U.S. PATENT DOCUMENTS

| | | | | |
|---|---|---|---|---|
| 5,225,759 A | * | 7/1993 | Endo et al. ................... | 318/778 |
| 5,592,058 A | * | 1/1997 | Archer et al. .......... | 318/400.09 |
| 6,111,372 A | | 8/2000 | Nishimura | |
| 6,181,093 B1 | * | 1/2001 | Park et al. .............. | 318/400.34 |
| 6,483,270 B1 | * | 11/2002 | Miyazaki et al. ............ | 318/700 |

FOREIGN PATENT DOCUMENTS

| | | |
|---|---|---|
| JP | 54-136615 | 10/1979 |
| JP | 01-234090 | 9/1989 |
| JP | 08-149879 | 6/1996 |
| JP | 11-299283 | 10/1999 |
| JP | 2002-214256 | 7/2002 |

* cited by examiner

*Primary Examiner*—Rita Leykin
(74) *Attorney, Agent, or Firm*—Fish & Richardson P.C.

(57) ABSTRACT

There is provided a brushless motor drive control circuit capable of assuring an S/N ratio of a predetermined counter electromotive voltage and suppressing lowering of efficiency of a brushless motor at a high-speed rotation. More specifically, the brushless motor drive control circuit includes: counter electromotive voltage filter circuits for inputting 3-phase counter electromotive voltage induced at the end of each of the stator coils and switching between a first and a second time constant according to the rotation speed of the rotor so as to pass a low-range frequency component corresponding to the time constant; counter electromotive voltage detection comparators for inputting the counter electromotive voltage which has passed through the counter electromotive voltage filter circuit and comparing it with voltage at a neutral point so as to output counter electromotive voltage polarity signals as the comparison results; and a motor driver control circuit for switching/controlling the time constant of the counter electromotive filter circuits and controlling the motor driver according to the counter electromotive voltage polarity signals.

4 Claims, 4 Drawing Sheets

BRUSHLESS MOTOR DRIVE CONTROL CIRCUIT AND BRUSHLESS MOTOR DEVICE USING THE SAME

TECHNICAL FIELD

The present invention relates to a brushless motor drive control circuit for executing sensorless drive control of a brushless motor having a 3-phase stator coil and a brushless motor device using the same.

BACKGROUND ART

A brushless motor drive control circuit of this kind controls drive of a brushless motor by detecting a counter electromotive voltage at a 3-phase stator coil generated along with rotation of a rotor by means of a comparator and detecting a rotation position of the rotor based on the counter electromotive voltage without using a hole element (e.g. Japanese Patent Laying-Open No. 8-149879 (Patent Document 1)).

Here, because an amplitude of a counter electromotive voltage generated at the stator coil is proportional to a rotation speed of the rotor, at low-speed rotation, the amplitude of the counter electromotive voltage is smaller as compared with that obtained at high-speed rotation, so that its ratio to noise, that is, an S/N ratio is liable to be low. As a solution thereof, noise is removed through a low-pass filter before detection of a counter electromotive voltage by the comparator to assure a predetermined S/N ratio, thereby preventing degradation of counter electromotive voltage detection precision. More specifically, the noise is switching noise generated when the brushless motor is PWM-driven (pulse width modulation) or the like. In addition, at low-speed rotation includes at the start of rotor rotation and at the time of shift to rotation stop other than at stationary low-speed rotation.

Patent Document 1: Japanese Patent Laying-Open No. 8-149879

DISCLOSURE OF THE INVENTION

Problems to be Solved by the Invention

Thus, a conventional brushless motor drive control circuit enables a predetermined S/N ration to be assured by adding a low-pass filter. On the other hand, according to a time constant which the low-pass filter has, input of a counter electromotive voltage corresponding to a rotation position of a rotor to a comparator is delayed. As a result, output of the brushless motor drive control circuit goes out of timing for efficiently rotating the rotor according to a delay time to lower efficiency. At high-speed rotation, in particular, because an electrical angle corresponding to the delay time of the counter electromotive voltage is increased, efficiency of the brushless motor is further lowered and in an extreme case, the rotor might be stopped.

An object of the present invention, which takes the above problems into consideration, is to provide a brushless motor drive control circuit capable of assuring an S/N ratio of a predetermined counter electromotive voltage and suppressing reduction of efficiency of a brushless motor at high-speed rotation and a brushless motor device using the same.

Means for Solving the Problems

In order to achieve the above object, the brushless motor drive control circuit according to the present invention is a brushless motor drive control circuit for controlling, through a motor driver, drive of a brushless motor whose rotor is rotated by the flow of a driving current to 3-phase stator coils having one end connected to a common neutral point, which includes at least one counter electromotive voltage filter circuit for inputting a voltage at the neutral point and a counter electromotive voltage induced at the other end of each of the stator coils and switching at least between first and second time constants according to a rotation speed of the rotor to pass a low-range frequency component corresponding to the time constant, at least one counter electromotive voltage detection comparator for comparing the counter electromotive voltage which has passed through the counter electromotive voltage filter circuit and a voltage at the neutral point to output a counter electromotive voltage polarity signal as the comparison result, and a motor driver control circuit for controlling switching of the time constant of the counter electromotive voltage filter circuit and controlling the motor driver according to the counter electromotive voltage polarity signal.

Preferably, in the brushless motor drive control circuit, the counter electromotive voltage filter circuit is three counter electromotive voltage filter circuits for in parallel inputting 3-phase counter electromotive voltages, respectively, and the counter electromotive voltage detection comparator is three counter electromotive voltage detection comparators for in parallel inputting 3-phase counter electromotive voltages which have passed through the three counter electromotive voltage filter circuits, respectively.

Preferably, in the brushless motor drive control circuit, a counter electromotive voltage multiplexer for inputting 3-phase counter electromotive voltages and time-divisionally outputting the same is further provided, and the counter electromotive voltage filter circuit is one counter electromotive voltage filter circuit for inputting an output voltage of the counter electromotive voltage multiplexer as a 3-phase counter electromotive voltage and the counter electromotive voltage detection comparator is one counter electromotive voltage detection comparator for inputting a counter electromotive voltage which has passed through the counter electromotive voltage filter circuit.

The brushless motor device according to the present invention includes a brushless motor, a motor driver for driving the brushless motor and a brushless motor drive control circuit for controlling, through the motor driver, drive of the brushless motor whose rotor is rotated by the flow of a driving current to 3-phase stator coils having one end connected to a common neutral point. The brushless motor drive control circuit includes at least one counter electromotive voltage filter circuit for inputting a voltage at the neutral point and a counter electromotive voltage induced at the other end of each of the stator coils and switching at least between first and second time constants according to a rotation speed of the rotor to pass a low-range frequency component corresponding to the time constant, at least one counter electromotive voltage detection comparator for comparing the counter electromotive voltage which has passed through the counter electromotive voltage filter circuit and a voltage at the neutral point to output a counter electromotive voltage polarity signal as the comparison result, and a motor driver control circuit for controlling switching of the time constant of the counter electromotive voltage filter circuit and controlling the motor driver according to the counter electromotive voltage polarity signal.

Effects of the Invention

Since the brushless motor drive control circuit and the brushless motor device using the same according to the present invention includes the counter electromotive voltage filter circuit for switching at least between first and second time constants according to a rotation speed of the rotor to pass a low-range frequency component corresponding to the time constant, at low-speed rotation, an S/N ratio of a predetermined counter electromotive voltage can be assured by increasing the time constant to enhance noise removal effects and at high-speed rotation, lowering of efficiency of the brushless motor can be suppressed by reducing a delay of a counter electromotive voltage caused by the counter electromotive voltage filter circuit.

Figure 1:
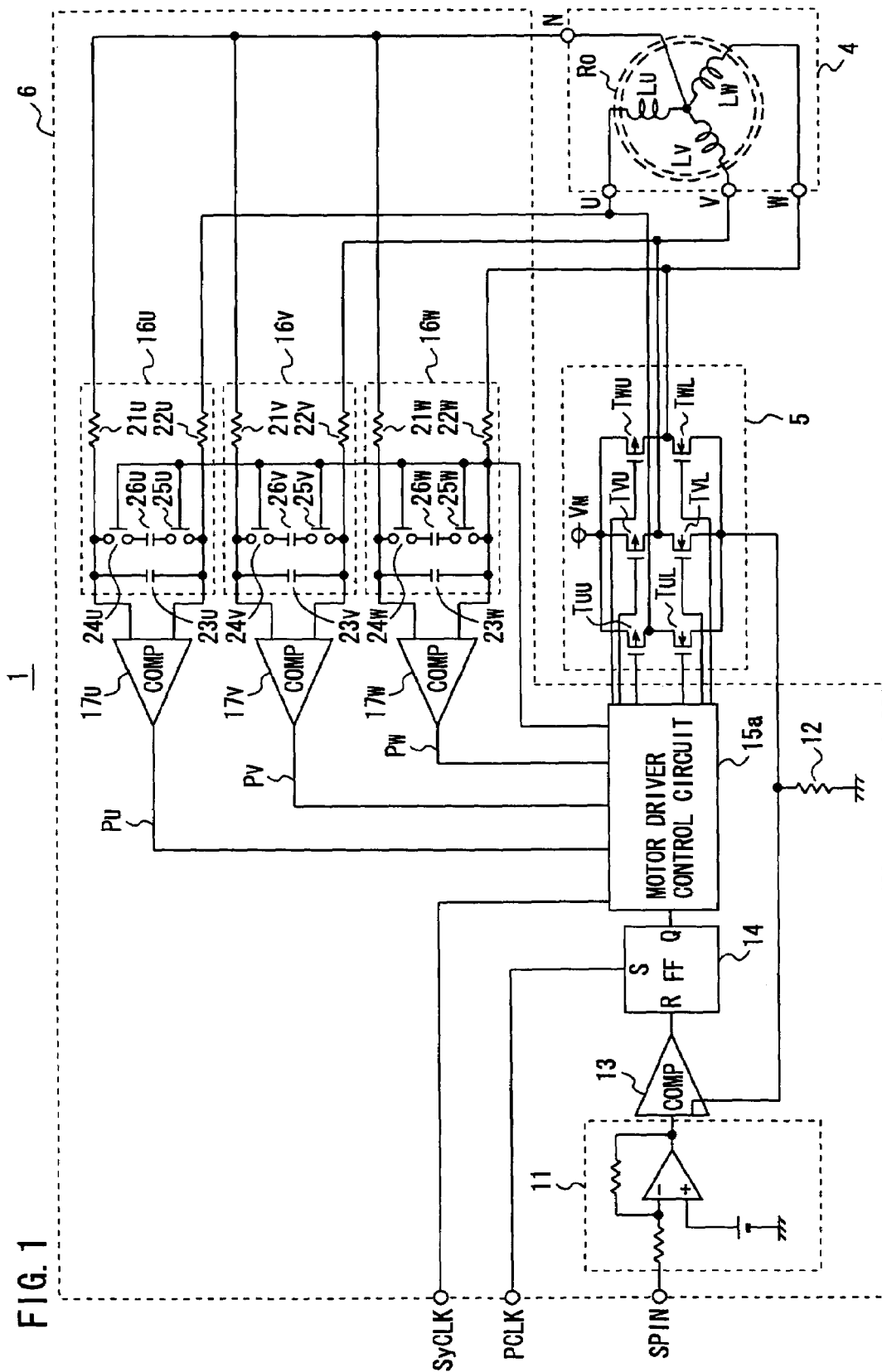
FIG. 1 is a diagram showing a brushless motor drive circuit and a brushless motor device using the same according to an embodiment of the present invention.

DESCRIPTION OF THE REFERENCE SIGNS 1, 2: brushless motor device, 4: brushless motor, 5: motor driver, 6, 7: brushless motor drive control circuit, 15a, 15b: motor driver control circuit, $16_U$, $16_V$, $16_W$, 16: counter electromotive voltage filter circuit, $17_U$, $17_V$, $17_W$, 17: counter electromotive voltage detection comparator.

BEST MODES FOR CARRYING OUT THE INVENTION

Embodiments of the present invention will be hereafter described with reference to the drawings. In the drawings, like or the same parts are indicated by the same reference characters and accordingly, description thereof is not repeated here.

In the following, description will be made of a brushless motor drive control circuit and a brushless motor device using the same as a best mode for carrying out the present invention.

FIG. 1 is a diagram for use in explaining the brushless motor drive circuit and the brushless motor device using the same according to an embodiment of the present invention.

With reference to FIG. 1, a brushless motor device 1 according to the embodiment of the present invention includes a brushless motor 4, a motor driver 5 for driving brushless motor 4, and a brushless motor drive control circuit 6 for controlling motor driver 5 as shown in FIG. 1.

Brushless motor 4 includes a rotor $R_o$ formed of a permanent magnet whose N pole and S pole are disposed in a circumferential direction and 3-phase stator coils $L_U$, $L_V$ and $L_W$ of a U phase, a V phase and a W phase for controlling rotation of rotor $R_o$ by the flow of a current (driving current). Stator coils $L_U$, $L_V$ and $L_W$ are star-connected to have its one end connected to a common neutral point. Voltage at the neutral point is output to brushless motor drive control circuit 6 through a neutral point terminal N. To the other ends of stator coils $L_U$, $L_V$ and $L_W$, an output signal of motor driver 5 is input through terminals U, V and W, respectively. Then, counter electromotive voltages at the other ends of stator coils $L_U$, $L_V$ and $L_W$ are output to brushless motor drive control circuit 6.

Motor driver 5 is formed of three power supply side output transistors $T_{UU}$, $T_{VU}$ and $T_{WU}$ as P type MOS transistors and three ground side output transistors $T_{UL}$, $T_{VL}$ and $T_{WL}$ as N type MOS transistors.

Respective drains of power supply side output transistors $T^{uu}$, $T_{vu}$ and $T_{wu}$ and respective drains of ground side output transistors and $T_{WL}$ are connected to each other and connected to terminals U, V and W of brushless motor 4 as well.

Respective sources of power supply side output transistors $T_{UU}$, $T_{VU}$ and $T_{WU}$ are connected to a brushless motor driving power supply $V_M$ and sources of ground side transistors $T_{UL}$, $T_{VL}$ and $T_{WL}$ are connected to a ground potential through a current detection resistor 12 which will be described later.

To brushless motor drive control circuit 6, the voltages at the neutral point as one end of each of stator coils $L_U$, $L_V$ and $L_W$ are input in parallel through neutral point terminal N and 3-phase counter electromotive voltages induced at the other ends of stator coils $L_U$, $L_V$ and $L_W$ are input in parallel through terminals U, V and W.

In addition, brushless motor drive control circuit 6 includes three counter electromotive voltage filter circuits $16_U$, $16_V$ and $16_W$ for switching between first and second time constants according to a rotation speed of rotor $R_o$ and passing a low-range frequency component corresponding to the time constant, three counter electromotive voltage detection comparators $17_U$, $17_V$ and $17_W$ for in parallel inputting counter electromotive voltages which have passed through counter electromotive voltage filter circuits $16_U$, $16_V$ and $16_W$ and comparing them with the voltage at the neutral point to output counter electromotive voltage polarity signals $P_U$, $P_V$ and $P_W$ as the comparison results, and a motor driver control circuit 15a for controlling motor driver 5 according to counter electromotive voltage polarity signals $P_U$, $P_V$ and $P_W$.

Brushless motor drive control circuit 6 further includes an inverting amplifier 11 for inverting and amplifying an input voltage for a speed instruction from a voltage input terminal SPIN to output a rotation speed control voltage, the above-described current detection resistor 12 for converting a driving current of brushless motor 4 which flows from motor driver 5 into a voltage, a rotation speed control comparator 13 for comparing the voltage and the rotation speed control voltage to output the comparison result, and a flip-flop circuit (FF) 14 which is set by a leading edge of a PWM reference clock (e.g. frequency 167 kHz) input to a set input terminal S from a PWM reference clock input terminal PCLK and when the voltage of current detection resistor 12 coincides with the rotation speed control voltage, is reset by an output signal of rotation speed control comparator 13 which is input to a reset input terminal R so as to output a PWM signal from an output terminal Q to motor driver control circuit 15a.

More specifically, counter electromotive voltage filter circuit $16_U$ includes a resistor $21_U$ (e.g. resistance value of 10 kΩ) having one end connected to neutral point terminal N and the other end connected to one input end of comparator $17_U$, a resistor $22_U$ (e.g. resistance value of 10 kΩ) having one end connected to terminal U of U-phase and the other end connected to the other input end of comparator $17_U$, a capacitor $23_U$ (e.g. capacitance value of 80 pF) having opposite ends connected to the two input ends of comparator $17_U$, and a capacitor $26_U$ (e.g. capacitance value of 1000 pF) having opposite ends connected to the two input ends of comparator $17_U$ through switches $24_U$ and $25_U$.

At rotation whose speed is equal to or lower than a predetermined rotation speed (e.g. 3000 rpm), switches $24_U$ and $25_U$ are closed to add capacitance of capacitor $26_U$ to capacitance of capacitor $23_U$. At this time, a large time constant determined by resistance values of resistors $21_U$ and $22_U$ and capacitance values of capacitors $23_U$ and $26_U$ will be the first time constant. At rotation whose speed exceeds the predetermined rotation speed, switches $24_U$ and $25_U$ are opened to have only capacitance of capacitor $23_U$. At this time, a small time constant determined by the resistance values of resistors $21_U$ and $22_U$ and the capacitance value of capacitor $23_U$ will be the second time constant.

The above-described switching operation of switches $24_U$ and $25_U$ is controlled by motor driver control circuit 15a as will be described later. The foregoing is substantially the same also in counter electromotive voltage filter circuits $16_V$ and $16_W$ as in counter electromotive voltage filter circuit $16_U$.

Motor driver control circuit 15a derives timing for controlling motor driver 5 from rotation position information of rotor $R_o$ indicated by counter electromotive voltage polarity signals $P_U$, $P_V$ and $P_W$. Then, obtain their cycles by counting a system clock (e.g. frequency of 1 MHz) input through a system clock input terminal SyCLK to execute switching control of the above switches $24_U$ and $25_U$ and the like according to which side of the predetermined rotation speed, a rotation speed corresponding to the cycle resides.

In addition, motor driver control circuit 15a outputs a signal for turning on a transistor selected among three power supply side output transistors $T_{UU}$, $T_{VU}$ and $T_{WU}$ of motor driver 5 according to the above-described control timing. Motor driver control circuit 15a also outputs PWM signal input from flip-flop circuit 14 to a transistor selected among three ground side output transistors $T_{UL}$, $T_{VL}$ and $T_{WL}$ according to the above-described timing.

Next, control operation of a rotation speed of brushless motor 4 will be described.

PWM signal enters an on-period in synchronization with a leading edge of PWM reference clock from PWM reference clock input terminal PCLK, so that a driving current of brushless motor 4 flows into current detection resistor 12. The current is increased until a voltage generated at current detection resistor 12 coincides with a rotation speed control voltage as an output of inverting amplifier 11 and when they coincide with each other, the on-period of PWM signal ends. Thus, by changing a voltage at voltage input terminal SPIN, the driving current of brushless motor 4 is changed to control the rotation speed.

Next, control operation of driving timing of brushless motor 4 according to the embodiment of the present invention will be described with reference to a waveform diagram shown in FIG. 2.

Figure 2:
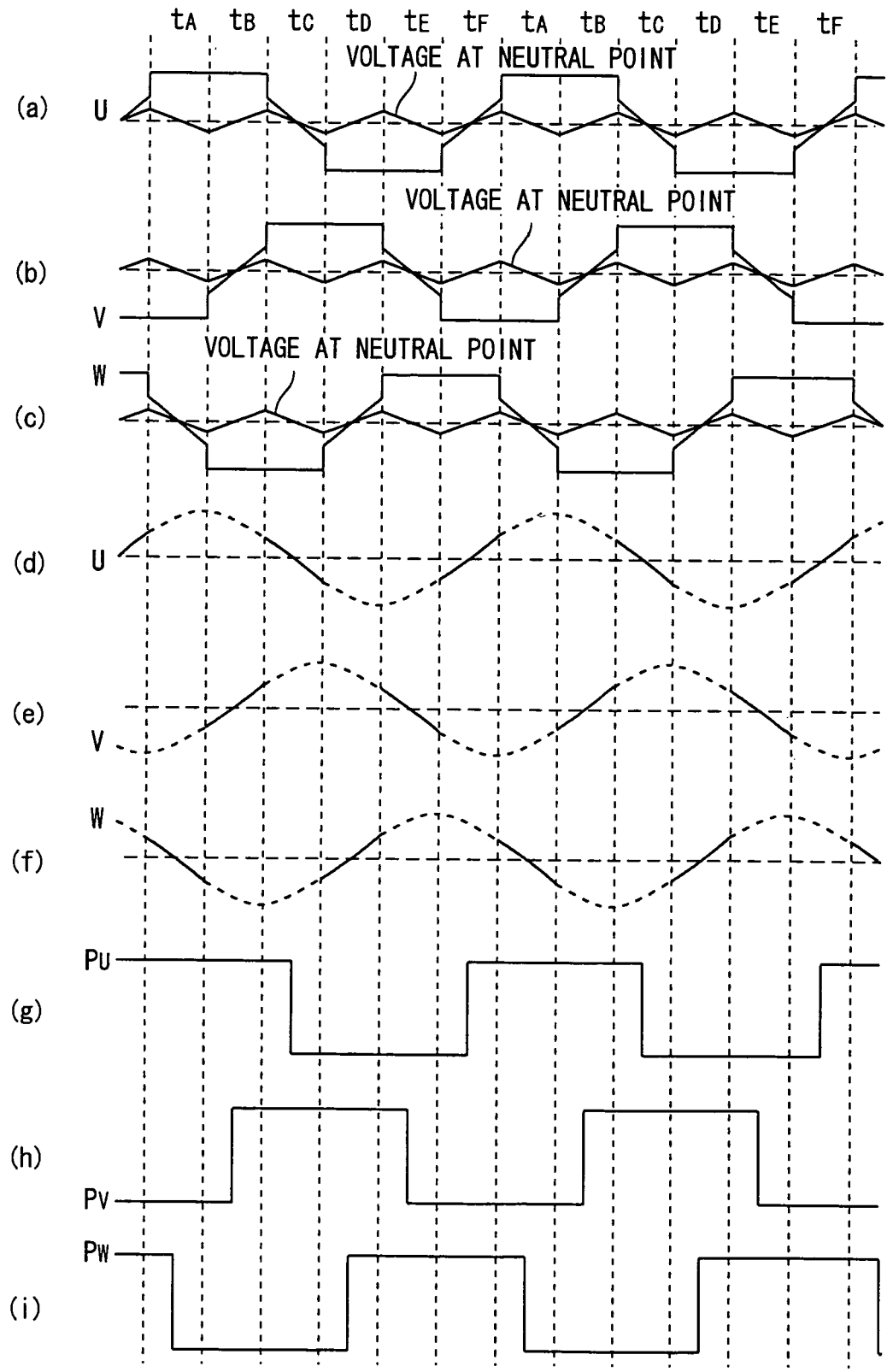
FIG. 2 is a waveform diagram for use in explaining operation of controlling driving timing of a brushless motor 4 according to the embodiment of the present invention.

FIGS. 2 (a), (b) and (c) are waveform diagrams of voltages at terminals U, V and W in brushless motor 4 (composite voltage waveform with an output voltage of motor driver 5 and counter electromotive voltage). In addition, FIGS. 2 (d), (e) and (f) are waveform diagrams of counter electromotive voltages at terminals U, V, and W. FIGS. 2 (g), (h) and (i) show waveforms of counter electromotive voltage polarity signals $P_U$, $P_V$ and $P_W$, respectively.

Also shown in FIGS. 2 (a), (b) and (c) are waveforms of voltages at the neutral point for reference sake. The counter electromotive voltage waveforms shown in FIGS. 2 (d), (e) and (f) appear at terminals U, V and W when they enter a high-impedance state as shown in FIGS. 2 (a), (b) and (c), respectively. In other words, when a voltage is applied by motor driver 5, a counter electromotive voltage is hidden by the applied voltage to prevent counter electromotive voltage waveforms from appearing at terminals U, V and W.

A time point when the counter electromotive voltages appearing at terminals U, V and W cross with a neutral point voltage of neutral point terminal N is when a boundary between the S pole and the N pole (switching of the polarity) in rotor $R_o$ comes at a position of each of stator coils $L_U$, $L_V$ and $L_W$. The polarity switching is detected by counter electromotive voltage detection comparators $17_U$, $17_V$ and $17_W$, so that counter electromotive voltage polarity signals $P_U$, $P_V$ and $P_W$ as their outputs change from a high level to a low level or from a low level to a high level as shown in FIGS. 2 (g), (h) and (i).

In the following, the figures (a), (b) and (c) will be described in more detail.

Description will be made with the cycle of rotor $R_o$ divided into $t_A$, $t_B$, $t_C$, $t_D$, $t_E$ and $t_F$ equivalent to an electrical angle of 60°.

In period $t_A$, power supply side output transistor $T_{UU}$ of U-phase and ground side output transistor $T_{VL}$ of V-phase are selected to flow a current from stator coil $L_U$ of U-phase to stator coil $L_V$ of V-phase. At this time, a neutral point voltage slowly decreasing appears at terminal N of the neutral point. At terminal W of W-phase in the high-impedance state, a counter electromotive voltage sharply decreasing appears which is induced by stator coil $L_W$.

In period $t_B$, power supply side output transistor $T_{UU}$ of U-phase and ground side output transistor $T_{WL}$ of W-phase are selected to flow a current from stator coil $L_U$ of U-phase to stator coil $L_W$ of W-phase. At this time, a neutral point voltage slowly increasing appears at terminal N of the neutral point. At terminal V of V-phase in the high-impedance state, a counter electromotive voltage sharply increasing appears which is induced by stator coil $L_V$.

In period $t_C$, power supply side output transistor $T_{VU}$ of V-phase and ground side output transistor $T_{WL}$ of W-phase are selected to flow a current from stator coil $L_V$ of V-phase to stator coil $L_W$ of W-phase. At this time, a neutral point voltage slowly decreasing appears at terminal N of the neutral point. At terminal U of U-phase in the high-impedance state, a counter electromotive voltage sharply decreasing appears which is induced by stator coil $L_U$.

In period $t_D$, power supply side output transistor $T_{VU}$ of V-phase and ground side output transistor $T_{UL}$ of U-phase are selected to flow a current from stator coil $L_V$ of V-phase to stator coil $L_U$ of U-phase. At this time, a neutral point voltage slowly increasing appears at terminal N of the neutral point. At terminal W of W-phase in the high-impedance state, a counter electromotive voltage sharply increasing appears which is induced by stator coil $L_W$.

In period $t_E$, power supply side output transistor $T_{WU}$ of W-phase and ground side output transistor $T_{UL}$ of U-phase are selected to flow a current from stator coil $L_W$ of W-phase to stator coil $L_U$ of U-phase. At this time, a neutral point voltage slowly decreasing appears at terminal N of the neutral point. At terminal V of V-phase in the high-impedance state, a counter electromotive voltage sharply decreasing appears which is induced by stator coil $L_V$.

In period $t_F$, power supply side output transistor $T_{WU}$ of W-phase and ground side output transistor $T_{VL}$ of V-phase are selected to flow a current from stator coil $L_W$ of W-phase to stator coil $L_V$ of V-phase. At this time, a neutral point voltage slowly increasing appears at terminal N of the neutral point. At terminal U of U-phase in the high-impedance state, a counter electromotive voltage sharply increasing appears which is induced by stator coil $L_U$.

Thus, a counter electromotive voltage appears sequentially at terminals U, V and W in a period of every 60° of an electrical angle, so that detecting an intersection between the counter electromotive voltage and the neutral point voltage leads to detection of a rotation position of rotor R. Here, before being input to counter electromotive voltage detection comparators $17_U$, $17_V$ and $17_W$, the voltages of terminals U, V and W are input to counter electromotive voltage filter circuits $16_U$, $16_V$, and $16_W$ to have their noise removed to prevent reduction of counter electromotive voltage detection precision.

In a case of low-speed rotation when an amplitude of a counter electromotive voltage is decreased, switches $24_U$ and $25_U$ and the like are closed to have a large time constant, so that a cut-off frequency is reduced to enhance noise removal effects. Thus, at low-speed rotation, while the amplitude of the counter electromotive voltage is decreased, a predetermined S/N ratio can be assured. On the other hand, at high-speed rotation when the amplitude of the counter electromotive voltage is increased, switches $24_U$ and $25_U$ and the like are opened to have a small time constant, so that the cut-off frequency is increased to lessen noise removal effects.

Because the amplitude of the counter electromotive voltage is large, however, the S/N ratio will not be lower than that at low-speed rotation and because of a small time constant, delay of the counter electromotive voltage is reduced to enable lowering of efficiency of brushless motor device 1 to be suppressed.

Next, a brushless motor drive control circuit and a brushless motor device using the same as another mode for carrying out the present invention will be described.

Figure 3:
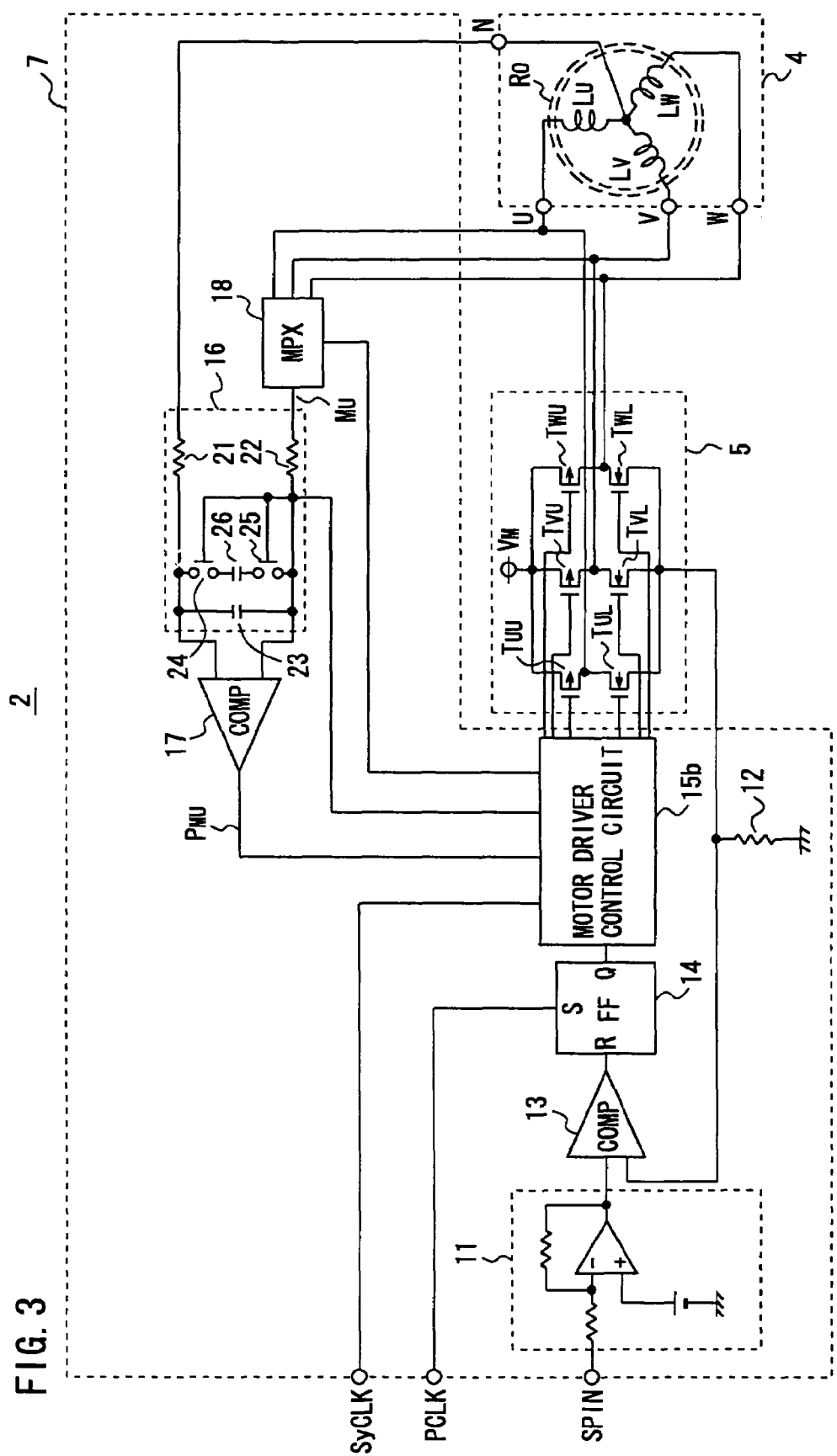
FIG. 3 is a diagram showing a circuit structure of a brushless motor drive control circuit and a brushless motor device using the same according to another embodiment of the present invention.

FIG. 3 is a diagram showing a circuit structure of the brushless motor drive control circuit and the brushless motor device using the same according to another embodiment of the present invention.

With reference to FIG. 3, a brushless motor device 2 according to another embodiment of the present invention includes a brushless motor drive control circuit 7 in place of brushless motor drive control circuit 6 in brushless motor 1 as illustrated in FIG. 3. Brushless motor drive control circuit 7 includes a counter electromotive voltage multiplexer (MPX) 18, one counter electromotive voltage filter circuit 16, one counter electromotive voltage detection comparator 17 and a motor driver control circuit 15b in place of three counter electromotive voltage filter circuits $16_U$, $16_V$ and $16_W$, three counter electromotive voltage detection comparators $17_U$, $17_V$ and $17_W$ and motor driver control circuit 15a in brushless motor drive control circuit 6. Counter electromotive voltage filter circuit 16 has the same structure as that of counter electromotive voltage filter circuit $16_U$ and the like.

Next, control operation of driving timing of brushless motor 4 according to another embodiment of the present invention will be described based on waveform diagrams shown in FIG. 4.

Figure 4:
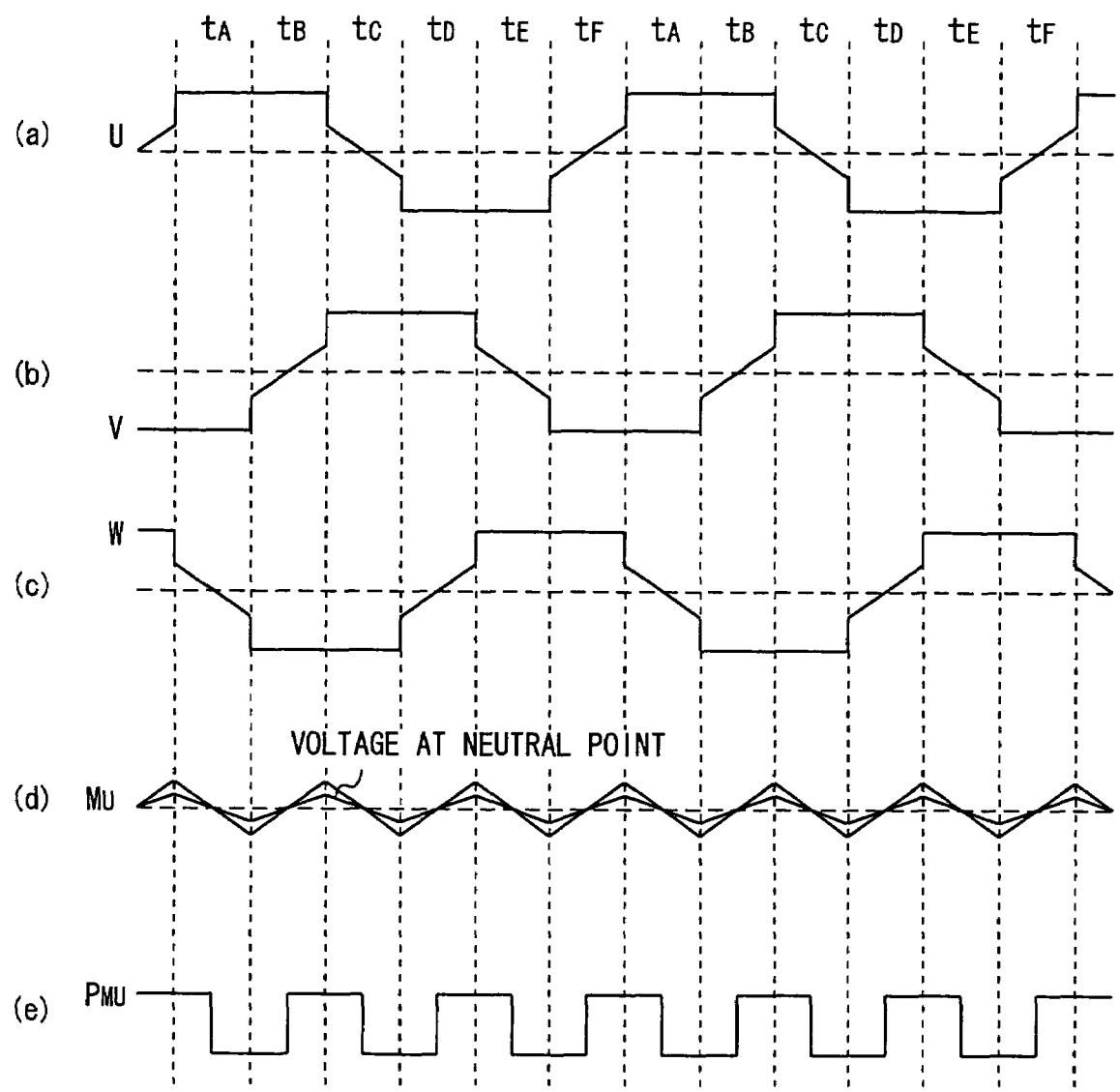
FIG. 4 is a waveform diagram for use in explaining operation of controlling driving timing of brushless motor 4 according to another embodiment of the present invention.

As shown in FIG. 4 (d), counter electromotive voltage multiplexer 18 inputs the voltages at terminals U, V and W represented in (a), (b) and (c) of FIG. 4 and time-divides a part of a counter electromotive voltage sequentially appearing at these terminals to output a voltage $M_U$. In FIG. 4 (d), a voltage at the neutral point is also represented for reference.

Counter electromotive voltage filter circuit 16 inputs a 3-phase counter electromotive voltage included in output voltage $M_U$ of counter electromotive voltage multiplexer 18 to remove noise in the same manner at low-speed rotation or high-speed rotation as in the above case.

As shown in FIG. 4 (c), counter electromotive voltage detection comparator 17 compares a counter electromotive voltage which has passed through counter electromotive voltage filter circuit 16 and the voltage at the neutral point to output a counter electromotive voltage polarity signal $P_{MU}$ as the comparison result.

Motor driver control circuit 15b derives timing for controlling motor driver 5 from rotation position information of rotor $R_0$ indicated by counter electromotive voltage polarity signal $P_{MU}$ and controls the same, and derives timing for controlling counter electromotive voltage multiplexer 18 and controls the same. In addition, switching of switches 24 and 25 in counter electromotive voltage filter circuit 16 is controlled according to a rotation speed corresponding to the cycle of counter electromotive voltage polarity signal $P_{MU}$.

Thus, brushless motor drive control circuit 7 has the same advantages as those of brushless motor drive control circuit 6. Furthermore, the number of counter electromotive voltage filter circuits and counter electromotive voltage detection comparators can be lessened to enable cost reduction.

Although counter electromotive voltage filter circuits $16_U$, $16_V$ and $16_W$, (or 16) switch the first and second time constants according to a rotation speed of rotor $R_0$, they can be designed to further switch first, second and third or more time constants according to the rotation speed.

While the present invention is effective in particular for one that PWM-drives brushless motor 4 such as the above-described brushless motor drive control circuits 6 and 7, that is, one having increased noise because of the driving, it is applicable also to a linear-driven brushless motor drive control circuit having less noise as compared with PWM-drive.

While the foregoing is the description of the brushless motor drive control circuit and the brushless motor device using the same according to the embodiments of the present invention, the present invention is not limited to the above-described embodiments and allows design modifications within the terms of the claims. For example, although motor driver control circuit 15a (or 15b) outputs PWM signal to ground side output transistors $T_{UL}$, $T_{VL}$, $T_{WL}$ of motor driver 5 to control a driving current, it can be designed to output PWM signal conversely to power supply side output transistors $T_{UU}$, $T_{VU}$, $T_{WU}$ to control the driving current. In addition, it is clearly understood that the counter electromotive voltage filter circuit, in order to have the first and second time constants, is allowed to have various elements and structures.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A brushless motor drive control circuit for controlling, through a motor driver, drive of a brushless motor whose rotor is rotated by the flow of a driving current to 3-phase stator coils having one end connected to a common neutral point, comprising:

at least one counter electromotive voltage filter circuit for inputting a voltage at the neutral point and a counter electromotive voltage induced at the other end of each phase of the stator coils and switching at least between first and second time constants according to a rotation speed of the rotor to pass a low-range frequency component corresponding to the time constant, at least one counter electromotive voltage detection comparator for comparing the counter electromotive voltage which has passed through said counter electromotive voltage filter circuit and the voltage at said neutral point to output a counter electromotive voltage polarity signal as the comparison result, and a motor driver control circuit responsive to said counter electromotive voltage polarity signal for controlling switching of said time constant of said counter electromotive voltage filter circuit and controlling said motor driver.

2. The brushless motor drive control circuit according to claim 1, wherein said counter electromotive voltage filter circuit is three counter electromotive voltage filter circuits for in parallel inputting 3-phase counter electromotive voltages, respectively, and said counter electromotive voltage detection comparator is three counter electromotive voltage detection comparators for in parallel inputting 3-phase counter electromotive voltages which have passed through the three counter electromotive voltage filter circuits, respectively.

3. The brushless motor drive control circuit according to claim 1, further comprising a counter electromotive voltage multiplexer for inputting 3-phase counter electromotive voltages to time-divisionally output the voltages, wherein said counter electromotive voltage filter circuit is one counter electromotive voltage filter circuit for inputting an output voltage of said counter electromotive voltage multiplexer as a 3-phase counter electromotive voltage, and said counter electromotive voltage detection comparator is one counter electromotive voltage detection comparator for inputting a counter electromotive voltage which has passed through the counter electromotive voltage filter circuit.

4. A brushless motor device, comprising:

a brushless motor, a motor driver for driving the brushless motor, and a brushless motor drive control circuit for controlling, through said motor driver, drive of said brushless motor whose rotor is rotated by the flow of a driving current to 3-phase stator coils having one end connected to a common neutral point, wherein said brushless motor drive control circuit includes at least one counter electromotive voltage filter circuit for inputting a voltage at the neutral point and a counter electromotive voltage induced at the other end of each of the stator coils and switching at least between first and second time constants according to a rotation speed of the rotor to pass a low-range frequency component corresponding to the time constant, at least one counter electromotive voltage detection comparator for comparing the counter electromotive voltage which has passed through said counter electromotive voltage filter circuit and the voltage at said neutral point to output a counter electromotive voltage polarity signal as the comparison result, and a motor driver control circuit responsive to said counter electromotive voltage polarity signal for controlling switching of said time constant of said counter electromotive voltage filter circuit and controlling said motor driver.

\* \* \* \* \*